(12) United States Patent
Clapp et al.

(10) Patent No.: US 11,913,540 B2
(45) Date of Patent: Feb. 27, 2024

(54) SELECTOR LOCK FOR A VEHICLE THAT INCLUDES A MOTOR OPERATED PAWL LOCK

(71) Applicant: GHSP, Inc., Holland, MI (US)

(72) Inventors: Glenn Clapp, Grand Haven, MI (US); Nicholas Spitler, Grand Haven, MI (US); Daniel Kushner, Ada, MI (US); Kristopher Alan Harrington, Hudsonville, MI (US)

(73) Assignee: GHSP, Inc., Holland, MI (US)

( * ) Notice: Subject to any disclaimer, the term of this patent is extended or adjusted under 35 U.S.C. 154(b) by 0 days.

(21) Appl. No.: 18/095,086

(22) Filed: Jan. 10, 2023

(65) Prior Publication Data

US 2023/0228325 A1 Jul. 20, 2023

Related U.S. Application Data

(60) Provisional application No. 63/300,184, filed on Jan. 17, 2022.

(51) Int. Cl.
*F16H 59/10* (2006.01)
*F16H 59/02* (2006.01)

(52) U.S. Cl.
CPC ....... *F16H 59/105* (2013.01); *F16H 59/0217* (2013.01)

(58) Field of Classification Search
CPC ....... F16H 2059/0282; F16H 2059/047; F16H 2059/048; F16H 61/16; F16H 61/18; F16H 61/24; F16H 2061/242
See application file for complete search history.

(56) References Cited

U.S. PATENT DOCUMENTS

| | | | | |
|---|---|---|---|---|
| 5,647,465 A | * | 7/1997 | Burkhard | F16H 59/10 192/220.2 |
| 5,797,295 A | * | 8/1998 | Kataumi | F16H 61/22 192/220.3 |
| 2004/0226801 A1 | * | 11/2004 | De Jonge | F16H 59/0204 192/220.7 |
| 2021/0199192 A1 | * | 7/2021 | Love | F16H 59/10 |
| 2022/0325791 A1 | * | 10/2022 | Soave | F16H 59/10 |

* cited by examiner

*Primary Examiner* — Gregory Robert Weber
(74) *Attorney, Agent, or Firm* — Price Heneveld LLP

(57) ABSTRACT

A selecting member for a vehicle includes a lever that is operable between a plurality of selector positions. A base includes a plurality of steps that correspond to the plurality of selector positions. A pawl actuator includes a pawl having a rack and a pinion gear that is rotationally operated by a motor. The motor selectively and rotationally operates the pinion gear to actuate the pawl relative to the plurality of steps. An interface is coupled with the lever that actuates the motor. Operation of the motor operates the pawl relative to the plurality of steps and allows the pawl actuator to be manipulated relative to the base to align the pawl with a step of the plurality of steps.

20 Claims, 8 Drawing Sheets

SELECTOR LOCK FOR A VEHICLE THAT INCLUDES A MOTOR OPERATED PAWL LOCK

CROSS-REFERENCE TO RELATED APPLICATION

This application claims priority to and the benefit under 35 U.S.C. § 119(e) of U.S. Provisional Patent Application No. 63/300,184, filed on Jan. 17, 2022, entitled SELECTOR LOCK FOR A VEHICLE THAT INCLUDES A MOTOR OPERATED PAWL LOCK, the entire disclosure of which is hereby incorporated herein by reference.

FIELD OF THE DEVICE

The device is in the field of selectors for vehicles, and more specifically, a motor-operated pawl lock that is used to secure the selector in a desired position and prevent movement of the selector in a manner that may damage components of the vehicle.

BACKGROUND OF THE DEVICE

Selectors are positioned within vehicles and are coupled with various mechanisms of the vehicle that can be operated by the user, as desired. These selectors can be in the form of rotational knobs, levers, buttons, and other similar interfaces that provide instructions to the mechanism for performing certain functions.

SUMMARY OF THE DISCLOSURE

According to an aspect of the present disclosure, a selector interface for a vehicle includes a selecting member that is operable between a plurality of selector positions. A base includes a plurality of steps that correspond to the plurality of selector positions, respectively. A pawl actuator includes a pawl that has a rack and a pinion gear that is rotationally operated by a motor. The motor selectively and rotationally operates the pinion gear to actuate the pawl relative to the plurality of steps. An interface is coupled with the selecting member that actuates the motor. Operation of the motor operates the pawl relative to the plurality of steps and allows the pawl actuator to be manipulated relative to the base to align the pawl with a step of the plurality of steps.

According to another aspect of the present disclosure, a selector interface for a vehicle includes a selecting member that is operable between a plurality of selector positions. A base includes a plurality of steps that correspond to the plurality of selector positions, respectively. A pawl actuator includes a pawl. Operation of the pawl actuator selectively and linearly operates the pawl relative to the plurality of steps. A biasing mechanism biases the pawl in an engaging direction and toward the plurality of steps. An interface is coupled with the selecting member that activates the pawl actuator and selectively operates the pawl relative to the plurality of steps. Operation of the pawl actuator selectively operates the pawl in a release direction that overcomes a biasing force of the biasing mechanism to locate the pawl in a traversing position characterized by selective operation of the selecting member through the plurality of selector positions, and deactivation of the interface deactivates the pawl actuator. The biasing mechanism biases the pawl in the engaging direction to engage a step of the plurality of steps.

According to another aspect of the present disclosure, a selector interface for a vehicle includes a selecting member that is operable between a plurality of selector positions. A base includes a plurality of steps that correspond to the plurality of selector positions, respectively. The base also includes an opposing surface that defines a neutral lock position that opposes the plurality of steps. A pawl actuator includes a pawl that has a rack and a pinion gear that is rotationally operated by a motor. The motor selectively and rotationally operates the pinion gear to actuate the pawl relative to the plurality of steps and the neutral lock position. An interface is coupled with the selecting member that actuates the motor. Operation of the motor operates the pawl relative to the plurality of steps and allows the pawl actuator to be manipulated relative to the base to align the pawl with at least one of a step of the plurality of steps and the neutral lock position.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
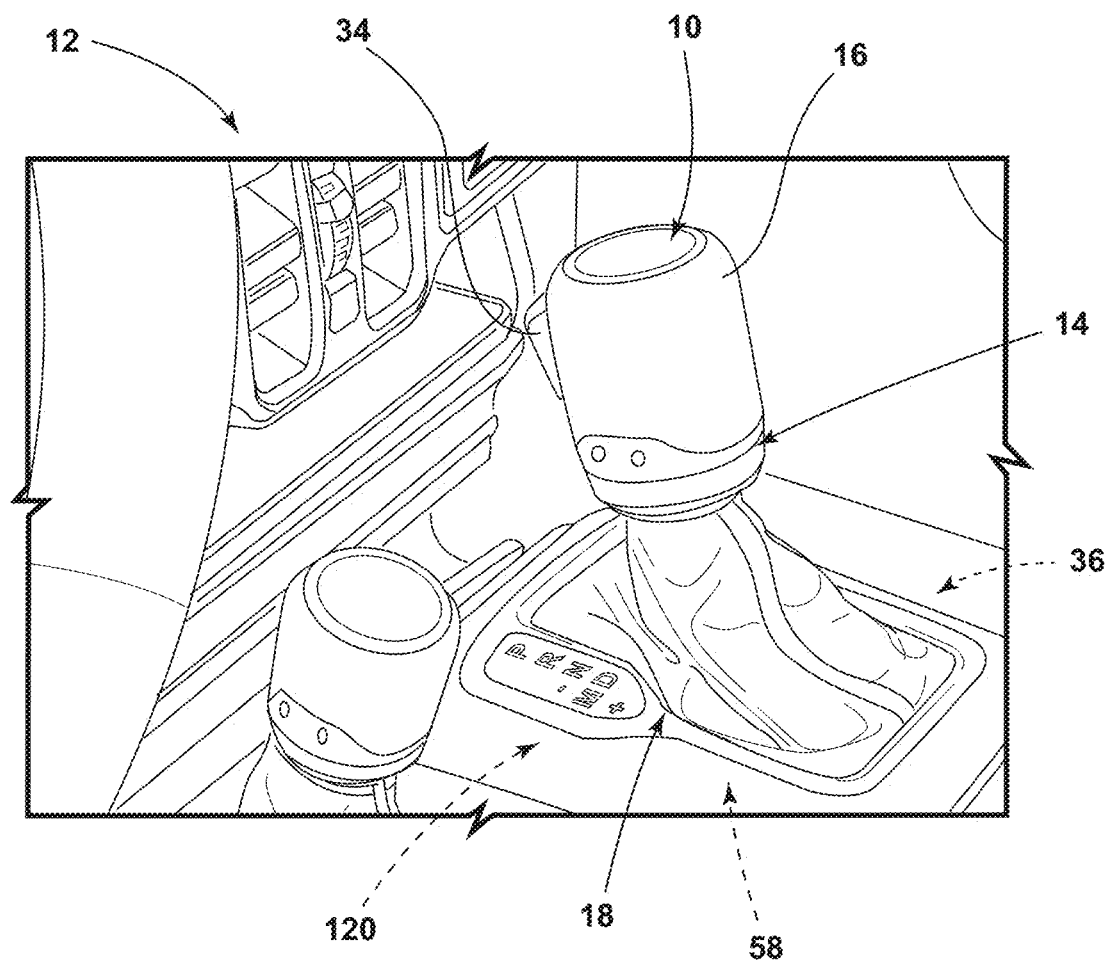
FIG. 1 is a perspective view of a selector lever that incorporates an aspect of the selector interface.
Figure 2:
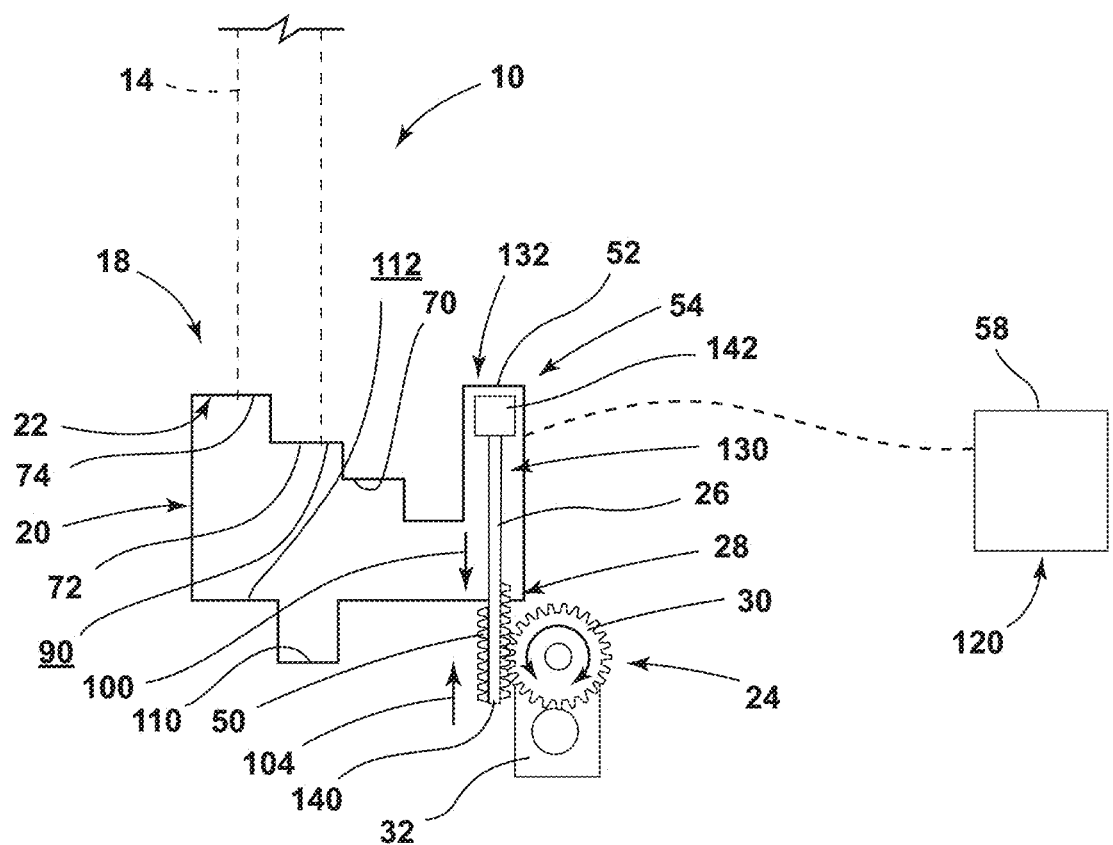
FIG. 2 is a schematic cross-sectional view of a selector interface that incorporates a base having a plurality of steps and a pawl actuator that operate with respect to one another for selecting between a plurality of gear positions.
Figure 3:
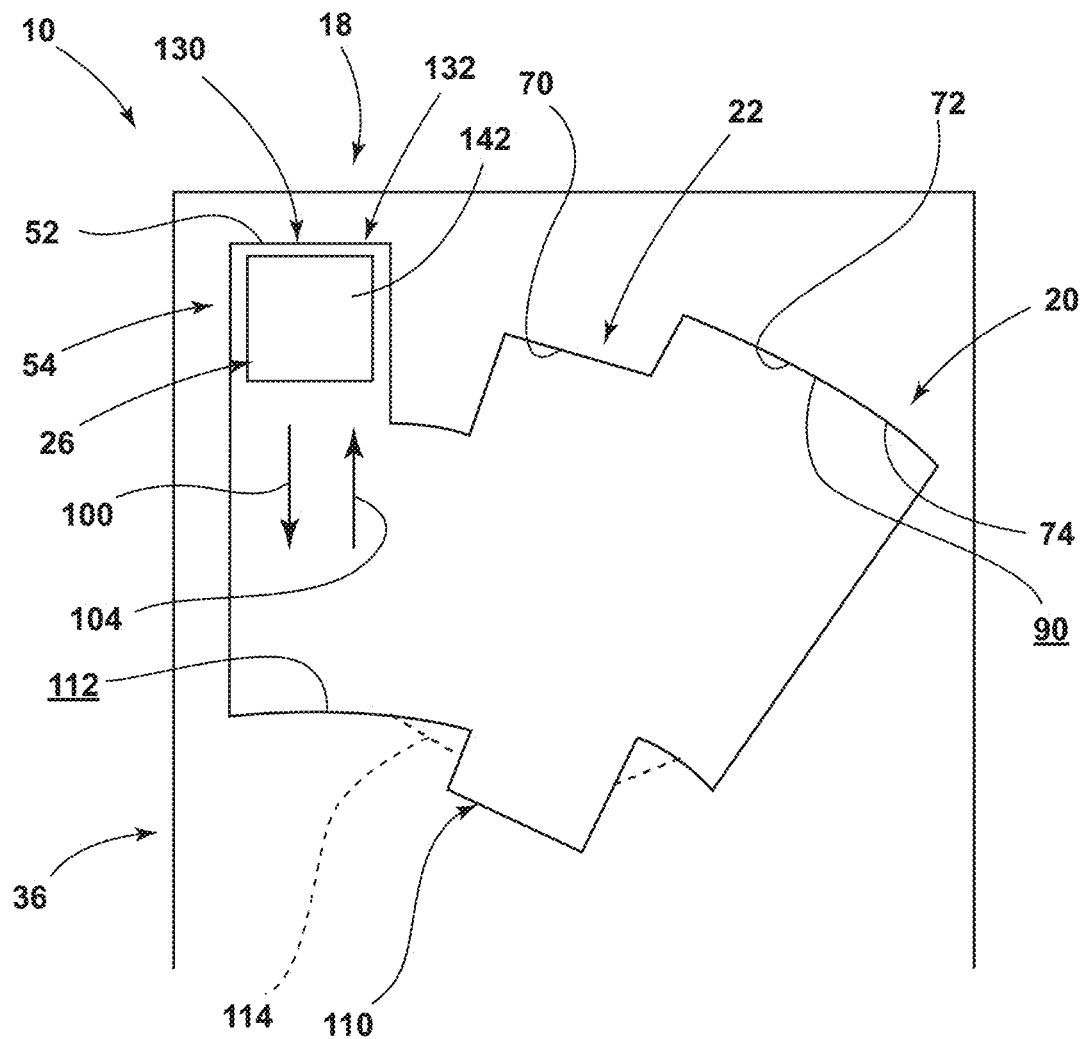
FIG. 3 is a schematic diagram showing the pawl in the park position.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a selector interface having a lever that is coupled to one of the base and a pawl actuator for allowing movement of the lever between a plurality of selector positions and also retaining the lever in a particular position to prevent movements of the selector interface that may result in damage to a vehicle transmission or other mechanism of the vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIGS. 1-8, reference numeral 10 generally refers to a selector interface that is incorporated within a vehicle 12. The selector interface 10 includes a selecting member 14 that is typically in the form of a dial, knob, lever 16, button, or other similar component that the user can interact with for delivering instructions to various mechanisms of the vehicle 12. According to various aspects of the device, the selector interface 10 for the vehicle 12 includes the selecting member 14, such as a lever 16, that is set within a frame 36, housing, or other support structure. The lever is operable between a plurality of selector positions 18. A base 20 includes a plurality of steps 22 that correspond to the plurality of selector positions 18, respectively. A pawl actuator 24 operates with respect to the base 20 and includes a pawl 26 having a rack 28. A pinion gear 30 is rotationally operated by a motor 32. Operation of the motor 32 selectively and rotationally operates the pinion gear 30 to linearly actuate the pawl 26 relative to the motor 32. This operation of the motor 32, in turn, operates the pawl 26 relative to the plurality of steps 22. The pawl actuator 24 and the base 20 operate with respect to one another in a rotational or sliding manner. The lever 16 is attached to one of the base 20 and the pawl actuator 24 such that manipulation of the lever 16 can be used to move the base 20 with respect to the pawl actuator 24 or to move the pawl actuator 24 with respect to the base 20. An interface 34 is coupled with the lever 16. The interface 34 actuates the motor 32 such that operation of the motor 32 operates the pawl 26 relative to the plurality of steps 22. This operation of the pawl 26 allows the pawl actuator 24 to be manipulated relative to the base 20. This manipulation of the pawl actuator 24 serves to align the pawl 26 with a particular step 22 of the plurality of steps 22.

Referring again to FIGS. 2-8, the pawl 26 for the pawl actuator 24 includes a biasing mechanism 50 that exerts a biasing force that biases the pawl 26 towards the plurality of steps 22. Accordingly, when the motor 32 is deactivated, the pawl 26 will be in engagement with one of the steps 22 of the plurality of steps 22. Typically, when the vehicle 12 is deactivated, the pawl 26 will be operated toward the park step 52 and biased against the park step 52 to define a parked position 54 of the plurality of selector positions 18. Placing the pawl actuator 24 in this position can be achieved manually through operation of the user. In addition, the selector interface 10 can include a return-to-park function 56 that automatically returns the pawl 26 to the park step 52 when power is lost or the vehicle 12 is otherwise deactivated. In certain aspects of the device, the various selector positions 18 can be defined by the plurality of steps 22 that progress along a general slope toward or away from the park step 52. Accordingly, when power is lost to the vehicle 12 or the vehicle 12 is deactivated, the biasing mechanism 50 that operates the pawl 26 towards the plurality of steps 22 can also bias the pawl actuator 24 towards the park step 52 to accomplish the return-to-park function 56. In certain configurations of the device, the interface 34 can be used to manually operate the pawl 26 in the release direction 100 to overcome a biasing force of the biasing mechanism 50. Such a function may be utilized in a situation where the vehicle 12 has lost power and the motor 32 of the pawl actuator 24 cannot operate. In this condition, operation of the interface 34 can move the pawl 26 in opposition to the biasing mechanism 50. Accordingly, where power is lost, the interface 34 and the biasing mechanism 50 can provide a backup system that can be used to provide a limited functionality for moving the pawl 26 at least to the park step 52 and/or the neutral step 72.

Referring again to FIG. 8, the rack 28 for the pawl actuator 24 can include a decoupled pawl. This decoupled pawl can include a straw 40 that is pushed upward by the pawl actuator 24. When this straw 40 is pushed upward and into one of the plurality of steps 52 that correspond to a desired selector position 18, the straw 40 can remain in position against the desired step 22 or selector position 18 for a period of time. With the straw 40 held in place, the pawl actuator 24 can be deenergized so that the rack 28 can return to an idle or resting position and separated from, or decoupled from, the straw 40. By deenergizing the pawl actuator 24, the pawl actuator 24 can be configured to use a minimum of electricity as the straw 40 is held in place in engagement with the desired step 22 of the plurality of steps 52. When it is desired that the lever 16 be moved to a different selector position 18, the straw 40 can be released from the desired step 22 and returned to engagement with the rack 28. With the straw 40 released the lever 16 can be operated through the plurality of selector positions 18.

In certain aspects of the device, the pawl actuator 24 can include various actuating mechanisms. These actuating mechanisms can include, but are not limited to, the rack 28 and pinion gear 30, a solenoid, a linear-operating actuator, a servo motor, stepper motor, a rotationally operable actuator, combinations thereof, and other similar actuating mechanisms that are able to manipulate the pawl 26 to selectively engage and disengage the plurality of steps 22.

Typically, the plurality of steps 22 includes the park step 52, a reverse step 70, a neutral step 72 and a drive step 74. Additional drive-accessory steps can be included for accomplishing various drive settings such as low, a shift setting, and other similar drive settings. Typically, the plurality of steps 22 are situated to selectively operate the return-to-park function 56 to allow the pawl 26 to slide across the positioning surface 90 of the plurality of steps 22 that allows the pawl 26 to come to rest in either the neutral step 72 or the park step 52. As discussed herein, the return-to-park function 56 operates in the absence of electrical power to the motor 32 and other components of the vehicle 12. This absence of power can be experienced when the vehicle 12 is deactivated or when power is lost unexpectedly.

Referring again to FIGS. 1-8, when a user operates the lever 16, the user may need to operate the interface 34 to activate the motor 32 of the pawl actuator 24. When the interface 34 is activated, the motor 32 operates the pawl 26 in a release direction 100 away from the plurality of steps 22. The motor 32 is configured to operate the pawl 26 to a traversing position 102 such that the lever 16 can be moved through or across each of the selector positions 18 without interference or substantial interference from the plurality of steps 22. In the traversing position 102, the pawl 26 is fully unlocked and is in a position relative to the base 20 that allows the base 20 to operate without engaging the steps 22. Consequently, the pawl 26 is fully separated from the base 20 and is allowed to translate across each of the plurality of steps 22 to arrive at a desired selector position 18. When the lever 16 is in the desired selector position 18 and the interface 34 is released, the pawl 26 is moved in an engaging direction 104 toward the plurality of steps 22. This engaging direction 104 can be operated through the biasing mechanism 50 that biases the pawl 26 towards the plurality of steps 22. Typically, the motor 32 for the pawl actuator 24 will operate to assist and guide the movement of the pawl 26 towards the plurality of steps 22. This controlled movement of the pawl 26 can prevent excessive impact of the pawl 26 colliding with the plurality of steps 22. Accordingly, the motor 32 can be used to operate the pawl 26 in each of the release direction 100 and the engaging direction 104 to control the operation of the pawl 26 and the remainder of the pawl actuator 24.

Referring again to FIGS. 2-7, the base 20 can include a neutral lock position 110 that may be defined within an opposing surface 112 of the base 20. The neutral lock position 110 can be used when the vehicle 12 is to be towed or in other emergency-type settings. When the pawl 26 is moved to a neutral lock position 110 of the base 20, the motor 32 operates the pawl 26 in the release direction 100 to fully separate from the plurality of steps 22 and extend into engagement with the opposing surface 112 of the base 20. This opposing surface 112 of the base 20 can include sloped portions 114 that slope toward the neutral lock position 110. In this manner, as the motor 32 operates the pawl 26 in the release direction 100, the pawl 26 can engage the sloped portions 114 of the opposing surface 112 of the base 20 and bias the base 20 towards the neutral lock position 110 of the selector interface 10.

Referring again to FIGS. 2-7, the selector interface 10 described herein is typically used for a shift-by-wire mechanism 120. The shift-by-wire mechanism 120 is a controller 58 that communicates instructions provided by the selector interface 10. These instructions can be communicated to a mechanical transmission for changing gears, as desired by the user. It is also contemplated that the selector interface 10 can operate a cable-operating mechanism that directly engages the transmission.

Figure 4:
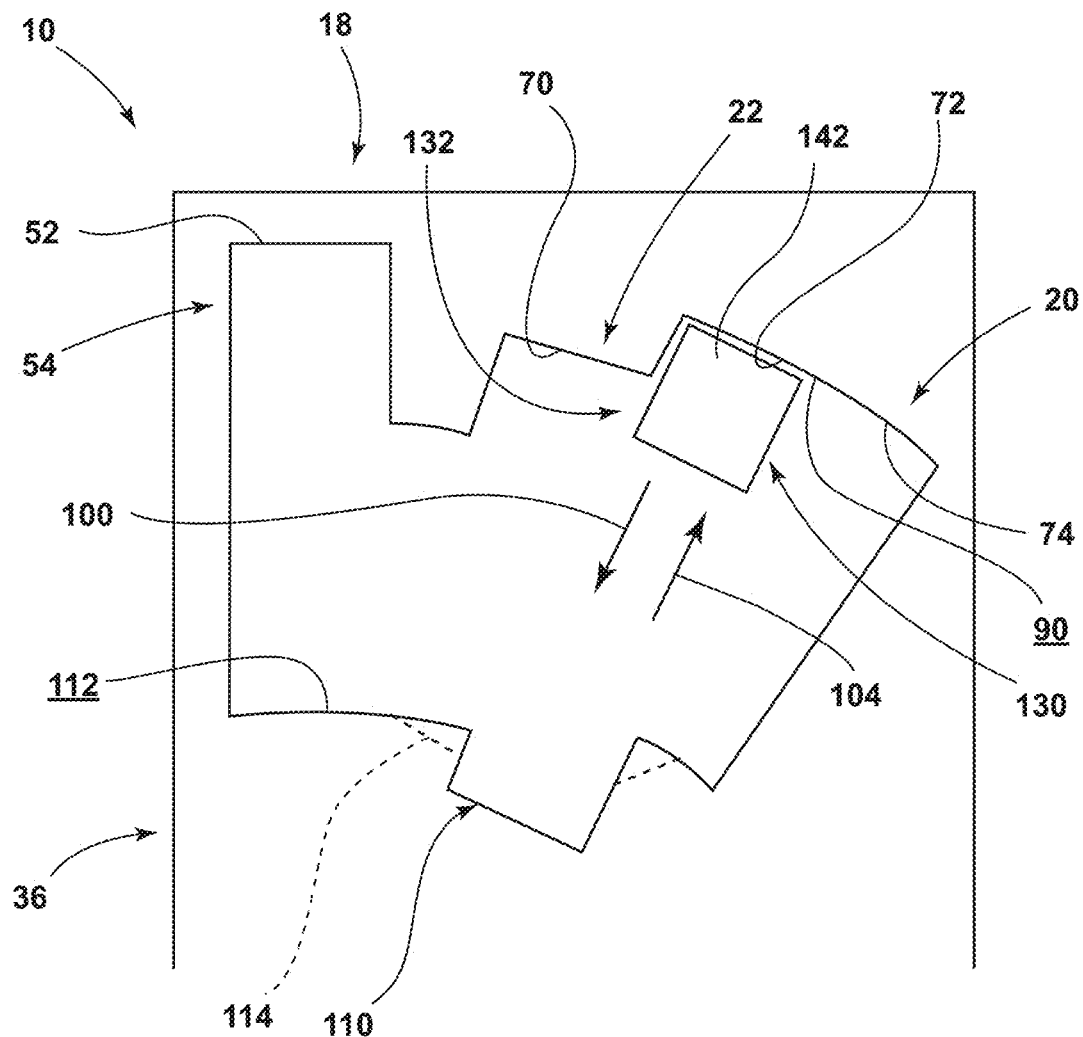
FIG. 4 is a schematic diagram showing the pawl in the neutral position.
Figure 5:
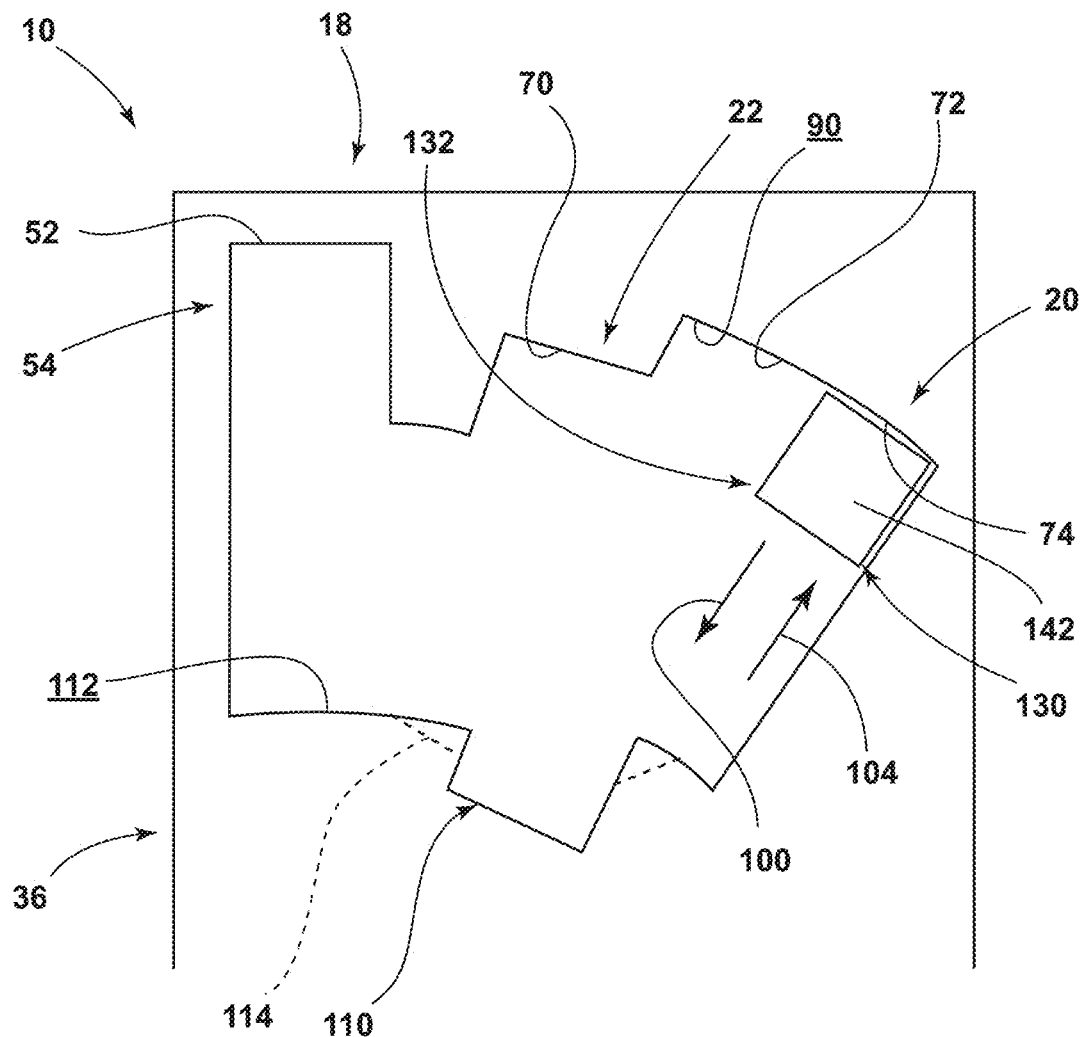
FIG. 5 is a schematic diagram showing the pawl in the drive position.
Figure 6:
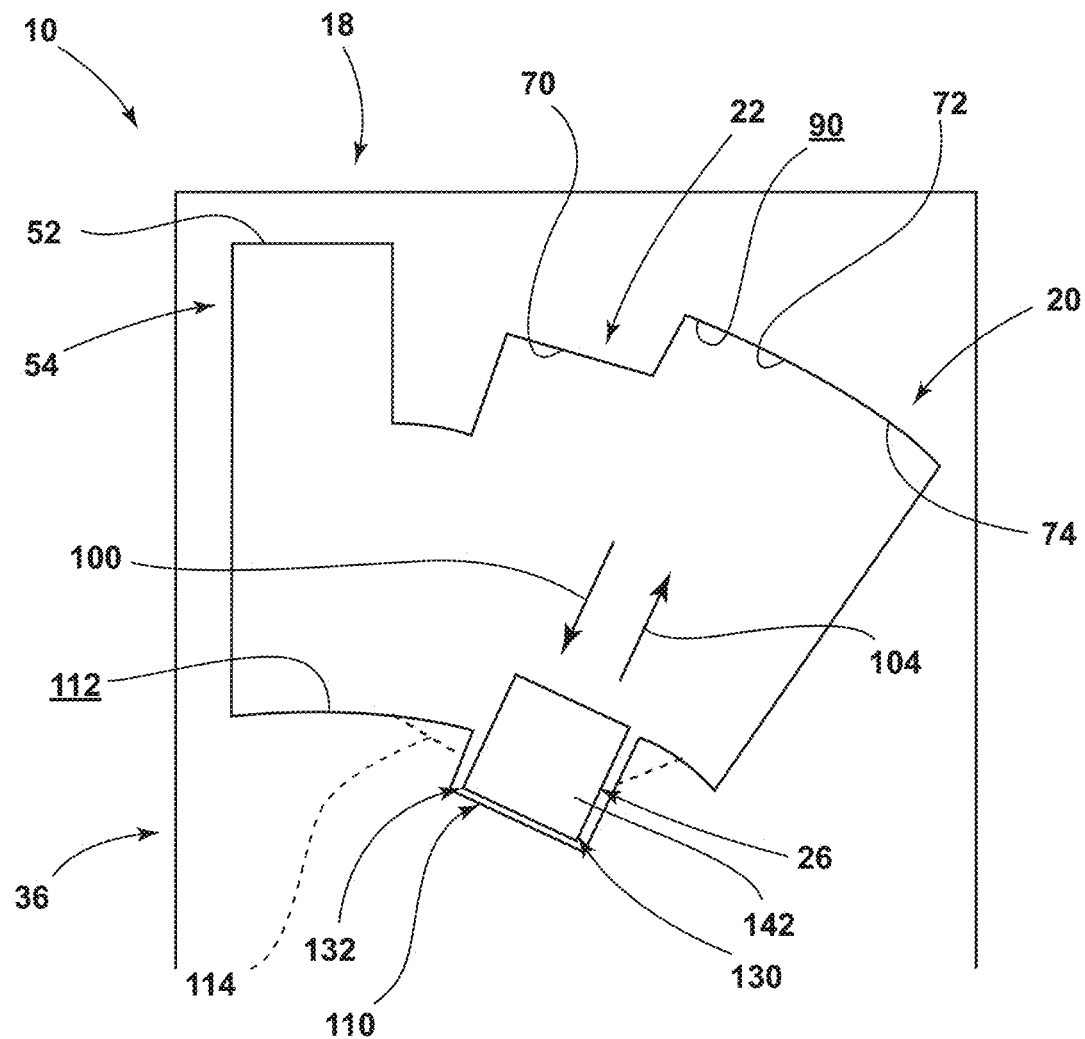
FIG. 6 is a schematic diagram showing the pawl in the neutral lock position.
Figure 7:
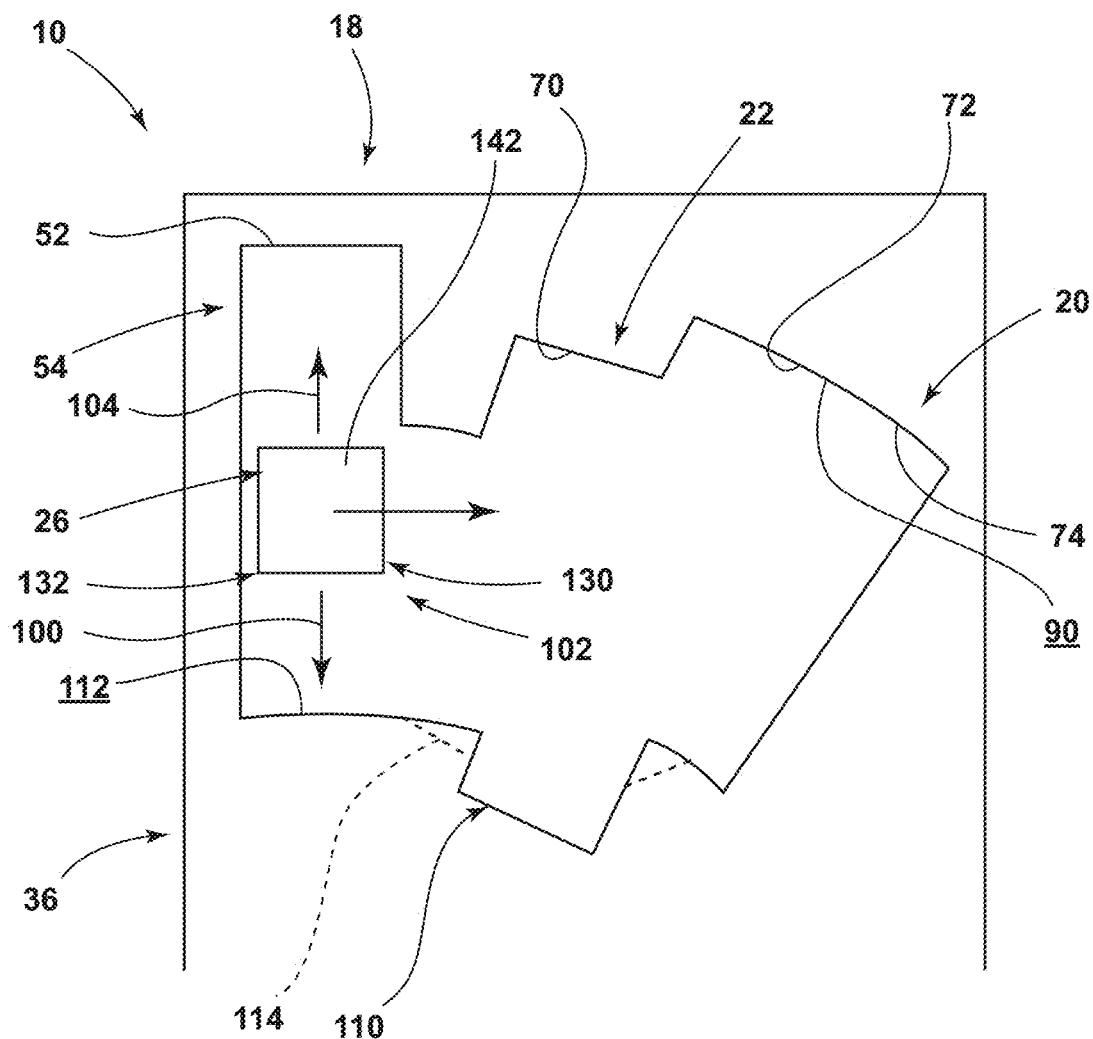
FIG. 7 is a schematic diagram showing the pawl in a fully unlocked state.
Figure 8:
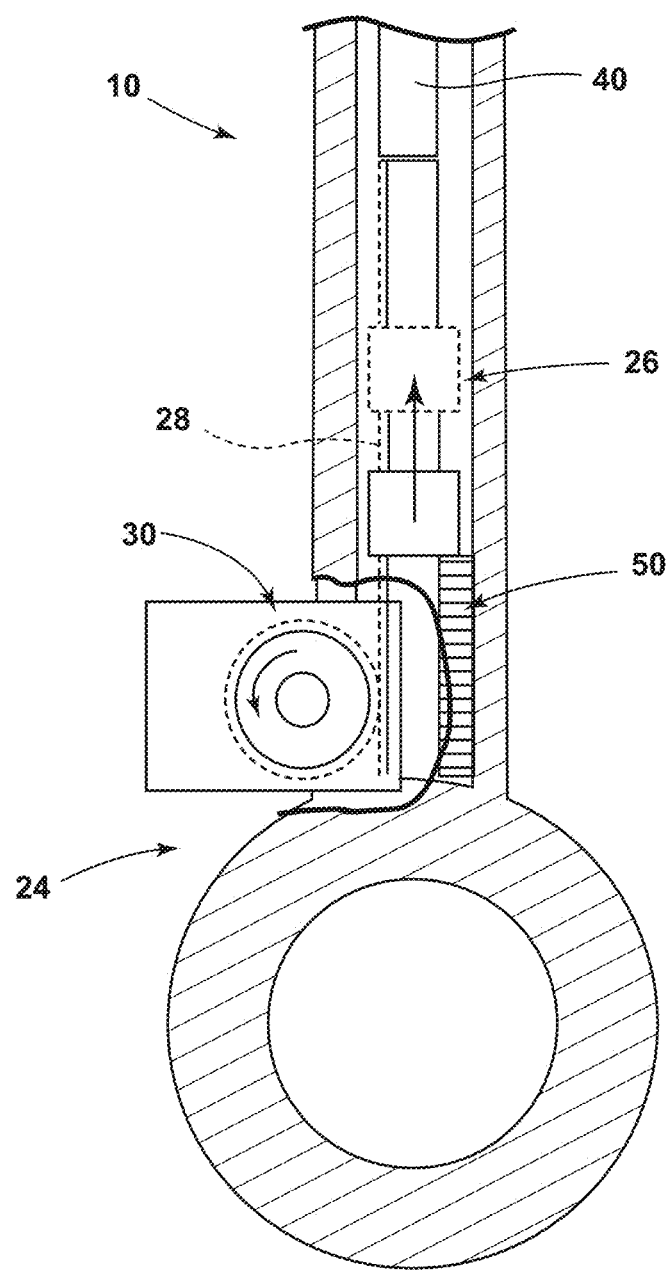
FIG. 8 is a schematic diagram showing operation of the pawl using the motor.

Referring now to FIGS. 4-5, the reverse step 70 and the drive step 74 can be positioned with the neutral step 72 in between. In this configuration, the lever 16 can be slidably operated from each of the drive step 74 and the reverse step 70 and into the neutral step 72. It is contemplated that the base 20 and the plurality of steps 22 are configured to prevent operation of the lever 16 and the pawl 26 from the reverse step 70 and into the drive step 74 without coming to rest on the neutral step 72. The same is typically true of the drive step 74.

According to the various aspects of the device, as exemplified schematically in FIGS. 3-7, the base 20 and the pawl actuator 24 are reflected in the drawings as being rotationally operable about an axis of rotation. In this manner, the steps 22 of the base 20 are oriented in an arcuate configuration to cooperate with a rotationally operable lever 16, knob or dial. It is also contemplated that the base 20 and the pawl actuator 24 can be operable in a linear or axial motion, as exemplified schematically in FIG. 2. In such an aspect of the device, the lever 16 can be adapted to slidably operate in a linear direction and along a longitudinal axis. In such an aspect of the device, the pawl actuator 24 and the base 20 are also positioned such that the steps 22 are generally parallel with one another, but at different distances from the motor 32. Other orientations and configurations of the steps 22 and the pawl actuator 24 are contemplated that are cooperative with various user interface mechanisms and paths of travel.

According to the various aspects of the device, the relative axial position of the pawl 26 with respect to the motor 32 and the pinion gear 30 can determine the instruction that is communicated to the transmission. The rotational position of the base 20 or the pawl actuator 24 can also be used to provide a particular instruction to the shift-by-wire mechanism 120. Accordingly, where a shift-by-wire mechanism 120 is connected with a selector interface 10, a relatively small motor 32 can be used for manipulating the pawl 26. Specifically, the shift-by-wire mechanism 120 uses the base 20 and the pawl actuator 24 for assigning digital instructions that are provided to a separate controller 58 for operating the transmission. In a cable configuration, the axial position 130 of the pawl 26 or the rotational position of the base 20 or the pawl actuator 24 may operate a cable that physically moves portions of the transmission for changing a gear setting for the transmission. Accordingly, a larger motor 32 may be required for manipulating the cable based upon the position of the pawl 26, the base 20 and the pawl actuator 24.

Referring again to FIGS. 2-8, where the shift-by-wire mechanism 120 is utilized, a portion of the pawl actuator 24 and the base 20 can cooperate to define a position sensor 132 that can be used for determining the desired selector position 18. This desired selector position 18 of the lever 16 can be used to communicate instructions to the controller 58 for operating the transmission. In at least one aspect of the device, a sensor 132, such as a positioning sensor, can be positioned relative to the pawl 26. Such a sensor 132 can include a magnet and corresponding magnet sensor that are positioned on or near the pawl 26. In such a configuration, the pawl 26 can include the magnet or, conversely, the pawl 26 can include the magnet sensor that interfaces with the magnet. Based upon the relative position of the pawl 26 with respect to the remainder of the pawl actuator 24, different instructions can be provided to the controller 58.

Additionally, the plurality of steps 22 defined by the base 20 can be utilized for positioning the pawl 26 in the appropriate condition to communicate the appropriate instruction to the shift-by-wire mechanism 120. It is also contemplated that the rotational position of the pawl 26 relative to the base 20 can be used for assigning particular instructions to communicate the selector position 18 of the lever 16.

As exemplified in the various aspects of the device, the pawl 26 and the pawl actuator 24 are utilized for locking the lever 16 in a particular angular position with respect to the base 20 and the pawl actuator 24. The pawl 26 is activated via the electric motor 32 to allow movement of the lever 16 with respect to the base 20 for purpose of changing transmission gears. As discussed herein, the lever 16 includes an interface 34 that, when activated, activates the motor 32 to move the pawl 26 in the release direction 100 so that the base 20 can be moved with respect to the pawl 26, or vice versa.

As described herein, the motor 32 can be affixed to the lever 16, such that when the lever 16 is moved to the various selector positions 18, the motor 32 and the pawl actuator 24 are moved with respect to the base 20. In such an aspect of the device, the base is typically in a fixed position with respect to the frame 36 that houses the selector interface 10. It is also contemplated that the base 20 can be attached to the lever 16 such that the movement of the lever 16 operates the base 20 with respect to a motor 32. In this aspect of the device, the pawl actuator 24, including the motor 32 is in a static location and remains in a fixed orientation with respect to the frame 36 that houses the selector interface 10. In this aspect of the device, the movement of the pawl 26 is limited to an axial and linear direction as the lever 16 and the base 20 move relative to the pawl 26 and the pawl actuator 24.

According to the various aspects of the device, the exact configuration, shape and spacing of the steps 22 of the base 20 can change depending upon the particular design of the transmission of the vehicle 12. In addition, the various steps 22 can be aligned in a radial direction such that the lever 16 that operates the base 20 (or the pawl actuator 24) rotates about a central axis of rotation. Through these various configurations, the selector can include a lever 16, dial or other similar user interface 34 that can be operated by the user for making various selections within the vehicle 12.

Referring again to FIGS. 2-8, the pawl 26 can include a rack portion 140 that includes the rack 28 that engages the pinion gear 30 that is operated by the motor 32. At either end of the rack portion 140 is an engaging member 142 that is configured to engage the various steps 22 of the plurality of steps 22 that are defined within the base 20. This engaging member 142 can also include the magnet sensor or the magnet that defines the positioning sensor 132 for the selector interface 10. As described herein, the positioning sensor 132 is used to assign instructions that are provided to the controller 58 or the shift-by-wire mechanism 120 for operating the transmission.

The selector interface 10 described herein can be used in connection with various electrical and mechanical assemblies within a vehicle 12. Such assemblies can include, but are not limited to, shift-by-wire mechanisms 120, transmissions, entertainment-related mechanisms, comfort-related mechanisms, information systems of the vehicle 12, and other similar vehicle mechanisms.

In various aspects of the device, the park-lock setting and the return-to-park function 56 can be incorporated within the selector interface 10 described herein. It is also contemplated that these park-related settings can be operated by a separate mechanism that operates in conjunction with the selector interface 10.

As exemplified in FIGS. 2-7, the plurality of steps 22 of the base 20 are oriented to prevent inadvertent sliding or slipping of the pawl 26 relative to the individual steps 22 in certain conditions. By way of example, and not limitation, where the pawl 26 is aligned with the drive step 74, the step 22 retains the pawl 26 to prevent slippage or sliding of the pawl 26 from the drive step 74 to the reverse step 70. Where the vehicle 12 is operated in a forward motion, movement of the pawl 26 to the reverse step 70 may provide an instruction to move the transmission to the reverse position. Accordingly, the configuration and shape of the various steps 22 of the base 20 are configured to prevent these incompatible movements or operations of the transmission. It is contemplated that from the drive step 74, the selector interface 10 may be moved to the neutral step 72. Similarly, the pawl 26 may be moved from the reverse step 70 to the neutral step 72. To assist in preventing these undesirable movements of the pawl actuator 24 with respect to the base 20, the pawl actuator 24 includes a pawl controller 58 that requires the performance of certain protocols in order to move the pawl 26 in certain conditions.

By way of example, and not limitation, in order to move the pawl 26 from the drive step 74 to the reverse step 70, the vehicle 12 must come to a complete stop, the interface 34 must be engaged and the operator must depress the brake pedal of the vehicle 12. After these protocols, and other protocols, have been achieved, only then can the pawl 26 be moved from the drive step 74 to the reverse step 70. Other protocols may be required for accomplishing similar motions of the pawl actuator 24 with respect to the base 20.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A selector interface for a vehicle, the selector interface comprising:
   a selecting member that is operable between a plurality of selector positions;
   a base that includes a plurality of steps that correspond to the plurality of selector positions, respectively;
   a pawl actuator that includes a pawl that is operable in an engaging direction toward the plurality of steps and a release direction that opposes the engaging direction, the pawl having a rack and a pinion gear that is rotationally operated by a motor, wherein the motor selectively and rotationally operates the pinion gear to actuate the pawl relative to the plurality of steps; and
   an interface coupled with the selecting member that actuates the motor, wherein operation of the motor operates the pawl relative to the plurality of steps and allows the pawl actuator to be manipulated relative to the base to align the pawl with a step of the plurality of steps, wherein the base includes a neutral lock position defined within an opposing surface of the base that opposes the plurality of steps, wherein selective activation of the motor in the release direction operates the pawl away from the plurality of steps to engage the opposing surface and to locate the pawl within the neutral lock position.

2. The selector interface of claim 1, wherein the selecting member is coupled to the base, and wherein operation of the selecting member moves the base with respect to the pawl actuator and the pawl.

3. The selector interface of claim 2, wherein the pawl actuator is in a static location with respect to a frame that surrounds the base, and wherein the pawl moves in a linear direction with respect to the pawl actuator and the frame.

4. The selector interface of claim 1, wherein the selecting member is attached to the pawl actuator and the base is coupled to a frame that surrounds the pawl actuator.

5. The selector interface of claim 4, wherein operation of the selecting member moves the pawl actuator and the pawl relative to the base.

6. The selector interface of claim 1, wherein the selecting member is a lever.

7. The selector interface of claim 1, wherein the pawl includes a biasing mechanism that biases the pawl in the engaging direction toward the plurality of steps of the base, and wherein operation of the pawl actuator linearly moves the pawl in the release direction and away from the plurality of steps.

8. The selector interface of claim 1, wherein the opposing surface includes sloped portions that slope toward the neutral lock position.

9. The selector interface of claim 1, wherein at least one of the base and the pawl actuator includes a positioning sensor that operates to determine a current selector position of the selecting member.

10. A selector interface for a vehicle, the selector interface comprising:
    a selecting member that is operable between a plurality of selector positions;
    a base that includes a plurality of steps that correspond to the plurality of selector positions, respectively;
    a pawl actuator that includes a pawl, wherein operation of the pawl actuator selectively and linearly operates the pawl relative to the plurality of steps in an engaging direction and a release direction that opposes the engaging direction;
    a biasing mechanism that biases the pawl in the engaging direction and toward the plurality of steps; and
    an interface coupled with the selecting member that activates the pawl actuator and selectively operates the pawl relative to the plurality of steps, wherein
        the operation of the pawl actuator selectively operates the pawl in the release direction that overcomes a biasing force of the biasing mechanism to locate the pawl in a traversing position characterized by selective operation of the selecting member through the plurality of selector positions; and
        deactivation of the interface deactivates the pawl actuator, wherein the biasing mechanism biases the pawl in the engaging direction to engage a step of the plurality of steps;
        the base includes a neutral lock position defined within an opposing surface of the base that opposes the plurality of steps; and
        selective activation of the pawl actuator selectively operates the pawl in the release direction to engage the opposing surface to locate the pawl within the neutral lock position.

11. The selector interface of claim 10, wherein the pawl actuator includes a rack and a pinion gear that is rotationally operated by a motor, wherein the motor selectively and rotationally operates the pinion gear to actuate the pawl at least in the release direction away from to the plurality of steps and toward the opposing surface.

12. The selector interface of claim 11, wherein the rack is attached to the pawl.

13. The selector interface of claim 11, wherein the opposing surface includes sloped portions that slope toward the neutral lock position.

14. The selector interface of claim 10, wherein the selecting member is coupled to the base, and wherein the operation of the selecting member moves the base with respect to the pawl actuator and the pawl.

15. The selector interface of claim 14, wherein the pawl actuator is in a static location with respect to a frame that surrounds the base, and wherein the pawl moves in a linear position with respect to the pawl actuator and the frame.

16. The selector interface of claim 10, wherein the selecting member is attached to the pawl actuator and the base is coupled to a frame that surrounds the pawl actuator.

17. The selector interface of claim 16, wherein the operation of the selecting member moves the pawl actuator and the pawl relative to the base.

18. The selector interface of claim 10, wherein the plurality of selector positions includes at least a drive position, a reverse position, and a neutral position, and wherein the neutral lock position of the opposing surface is aligned with the neutral position of the plurality of steps.

19. A selector interface for a vehicle, the selector interface comprising:
    a selecting member that is operable between a plurality of selector positions;
    a base that includes a positioning surface that defines a plurality of steps that correspond to the plurality of selector positions, respectively, the base also including an opposing surface that opposes the positioning surface and defines a neutral lock position that opposes the plurality of steps;
    a pawl actuator that includes a pawl that is operable in an engaging direction and a release direction that opposes the engaging direction, the pawl having a rack and a pinion gear that is rotationally operated by a motor, wherein the motor selectively and rotationally operates the pinion gear to actuate the pawl relative to the plurality of steps and the neutral lock position, wherein the pawl is operated in the engaging direction to engage the plurality of steps and in the release direction to engage the neutral lock position; and an interface coupled with the selecting member that actuates the motor, wherein operation of the motor operates the pawl relative to the plurality of steps and allows the pawl actuator to be manipulated relative to the base to align the pawl with at least one of a step of the plurality of steps and the neutral lock position.

20. The selector interface of claim 19, wherein the opposing surface includes sloped portions that slope toward the neutral lock position.

\* \* \* \* \*